United States Patent
Wong et al.

(10) Patent No.: US 11,711,838 B2
(45) Date of Patent: *Jul. 25, 2023

(54) WIRELESS TELECOMMUNICATIONS APPARATUSES AND METHODS FOR ALLOCATING DOWNLINK RESOURCES

(71) Applicant: Sony Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB)

(73) Assignee: SONY CORPORATION, Tokyo (JP)

(*) Notice: Subject to any disclaimer, the term of this patent is extended or adjusted under 35 U.S.C. 154(b) by 45 days.

This patent is subject to a terminal disclaimer.

(21) Appl. No.: 17/206,151

(22) Filed: Mar. 19, 2021

(65) Prior Publication Data

US 2021/0212076 A1 Jul. 8, 2021

Related U.S. Application Data

(63) Continuation of application No. 16/476,118, filed as application No. PCT/EP2017/081542 on Dec. 5, 2017, now Pat. No. 10,959,238.

(30) Foreign Application Priority Data

Jan. 6, 2017 (EP) ..................................... 17150570

(51) Int. Cl.
*H04L 5/00* (2006.01)
*H04W 72/541* (2023.01)
(Continued)

(52) U.S. Cl.
CPC ......... *H04W 72/541* (2023.01); *H04L 5/0055* (2013.01); *H04W 72/0466* (2013.01); *H04W 72/23* (2023.01)

(58) Field of Classification Search
CPC ............... H04W 72/12; H04W 72/042; H04W 72/044
See application file for complete search history.

(56) References Cited

U.S. PATENT DOCUMENTS

| 10,959,238 B2* | 3/2021 | Wong ................. H04W 72/042 |
| 2017/0303274 A1 | 10/2017 | He et al. |
| 2018/0035332 A1 | 2/2018 | Agiwal et al. |

(Continued)

FOREIGN PATENT DOCUMENTS

| CN | 108023665 A | 5/2018 |
| CN | 108430106 A | 8/2018 |

(Continued)

OTHER PUBLICATIONS

International Search Report and Written Opinion dated Feb. 20, 2018 for PCT/EP2017/081542 filed on Dec. 5, 2017, 9 pages.

(Continued)

*Primary Examiner* — Benjamin H Elliott, IV
(74) *Attorney, Agent, or Firm* — Xsensus LLP

(57) ABSTRACT

There is provided a method of transmitting downlink control-related information to a terminal in a wireless telecommunications system. The method comprises allocating downlink resources in a first set of resources for sending the downlink control-related information; determining that a further downlink transmission will be transmitted using at least part of the allocated downlink resources thereby identifying a collision between the downlink control-related information transmission and the further downlink transmission; upon identifying a collision, allocating a second set of resources for sending the downlink control-related information; and transmitting the downlink control-related information using at least the second set of resources.

20 Claims, 6 Drawing Sheets

(51) Int. Cl.
*H04W 72/044* (2023.01)
*H04W 72/23* (2023.01)

(56) References Cited

U.S. PATENT DOCUMENTS

| | | | |
|---|---|---|---|
| 2018/0070341 A1 | 3/2018 | Islam et al. | |
| 2018/0070369 A1 | 3/2018 | Papasakellariou | |
| 2018/0132237 A1 | 5/2018 | Sundararajan et al. | |
| 2018/0324770 A1 | 11/2018 | Nogami et al. | |
| 2019/0090218 A1 | 3/2019 | Noh et al. | |
| 2019/0173623 A1 | 6/2019 | Khosravirad et al. | |
| 2019/0222362 A1 | 7/2019 | Beale et al. | |
| 2019/0222461 A1 | 7/2019 | Atungsiri et al. | |
| 2019/0280841 A1 | 9/2019 | Fu et al. | |
| 2019/0306836 A1 | 10/2019 | Hong et al. | |
| 2019/0327751 A1 | 10/2019 | Dong et al. | |
| 2019/0357223 A1 | 11/2019 | Wong et al. | |
| 2019/0364449 A1 | 11/2019 | Yang et al. | |
| 2020/0186313 A1 | 6/2020 | Wong et al. | |
| 2020/0187225 A1 | 6/2020 | Xia et al. | |
| 2021/0212076 A1* | 7/2021 | Wong | H04L 5/0055 |

FOREIGN PATENT DOCUMENTS

| | | |
|---|---|---|
| WO | 2018/050431 A1 | 3/2018 |
| WO | 2018/059876 A1 | 4/2018 |
| WO | 2018/059993 A1 | 4/2018 |
| WO | 2018/086807 A1 | 5/2018 |
| WO | 2018/127343 A1 | 7/2018 |

OTHER PUBLICATIONS

ZTE et al., "Multiplexing of eMBB and Urllc", 3GPP TSG RAN WG1 Meeting No. 86 R1-166408, Gothenburg, Sweden, Aug. 22-26, 2016, 10 pages.

Convida Wireless, "On Downlink Control Channel Design for New Radio", 3GPP TSG RAN WG1 Meeting No. 86bis R1-1610379, Lisbon, Portugal, Oct. 10-14, 2016, 4 pages.

Sony, "Dynamic Resource Sharing for eMBB/URLLC in DL", 3GPP TSG RAN WG1 Meeting No. 87 R1-1613047, Reno, USA, Nov. 14-18, 2016, 5 pages.

Sony, "Considerations on Dynamic Resource Sharing for eMBB/URLLC in DL", 3GPP TSG RAN WG1 NR Ad-Hoc Meeting R1-1700677, Spokane, USA, Jan. 16-20, 2017, 7 pages.

Holma et al., "LTE for UMTS OFDMA and SC-FDMA Based Radio Access", Wiley 2009, System Architecture Based on 3GPP SAE, 11 pages.

QUALCOMM Incorporated, "Control channel for slot formal indicator", 3GPP TSG-RAN WG1 #87 R1-1612062, Nov. 14-18, 2016, Reno, Nevada, USA, pp. 1-2.

NIT Docomo, "New SID Proposal: Study on New Radio Access Technology", 3GPP TSG RAN Meeting No. 71 RP-160671, Goteborg, Sweden, Mar. 7-10, 2016, 8 pages.

English Translation of CN201610958372.4, retrieved from the Internet Jul. 6, 2020 (Year: 2020).

English Translation of CN201710002667.9, retrieved from the Internet Jul. 6, 2020 (Year: 2020).

* cited by examiner

WIRELESS TELECOMMUNICATIONS APPARATUSES AND METHODS FOR ALLOCATING DOWNLINK RESOURCES

CROSS-REFERENCE TO RELATED APPLICATIONS

This application is a continuation of U.S. application Ser. No. 16/476,118, filed Jul. 5, 2019, which is based on PCT filing PCT/EP2017/081542, filed on Dec. 5, 2017, which claims priority to EP 17150570.4, filed Jan. 6, 2017, the entire contents of each are incorporated herein by reference.

BACKGROUND

Field

The present disclosure relates to wireless telecommunications apparatuses and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

Future wireless communications networks will be expected to efficiently support communications with a wider range of devices associated with a wider range of data traffic profiles and types than current systems are optimised to support. For example it is expected that future wireless communications networks will efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance. A single device type might also be associated with different traffic profiles depending on the applications it is running. For example, different consideration may apply for efficiently supporting data exchange with a smartphone when it is running a video streaming application (high downlink data) as compared to when it is running an Internet browsing application (sporadic uplink and downlink data).

The new Radio Access Technology (RAT) for the next generation of mobile networks is expected to operate in a large range of frequencies, from hundreds of MHz to 100 GHz and it is expected to cover a broad range of use case, such as Enhanced Mobile Broadband (eMBB), Massive Machine Type Communications (mMTC), and Ultra Reliable & Low Latency Communications (URLLC).

When URLLC transmissions are being sent, due to their low latency nature, they can sometimes be sent urgently before resources have been freed to accommodate the URLCC transmission. As a result, this may cause a collision between a URLLC transmission and another transmission, most likely to be an eMBB transmission. Techniques discussing arrangements related to URLLC and eMBB data potential collisions are discussed in applications EP16189083.5 filed 15 Sep. 2016, EP16191978.2 filed 30 Sep. 2016, EP16191997.2 filed 30 Sep. 2016 and EP 16198538.7 filed 11 Nov. 2016, wherein the entire content of each of these applications is incorporated herein by reference. However, there are still further aspects of eMBB and URLLC collisions that can be addressed as will be clear from the present disclosure.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF EXAMPLE EMBODIMENTS

Figure 1:
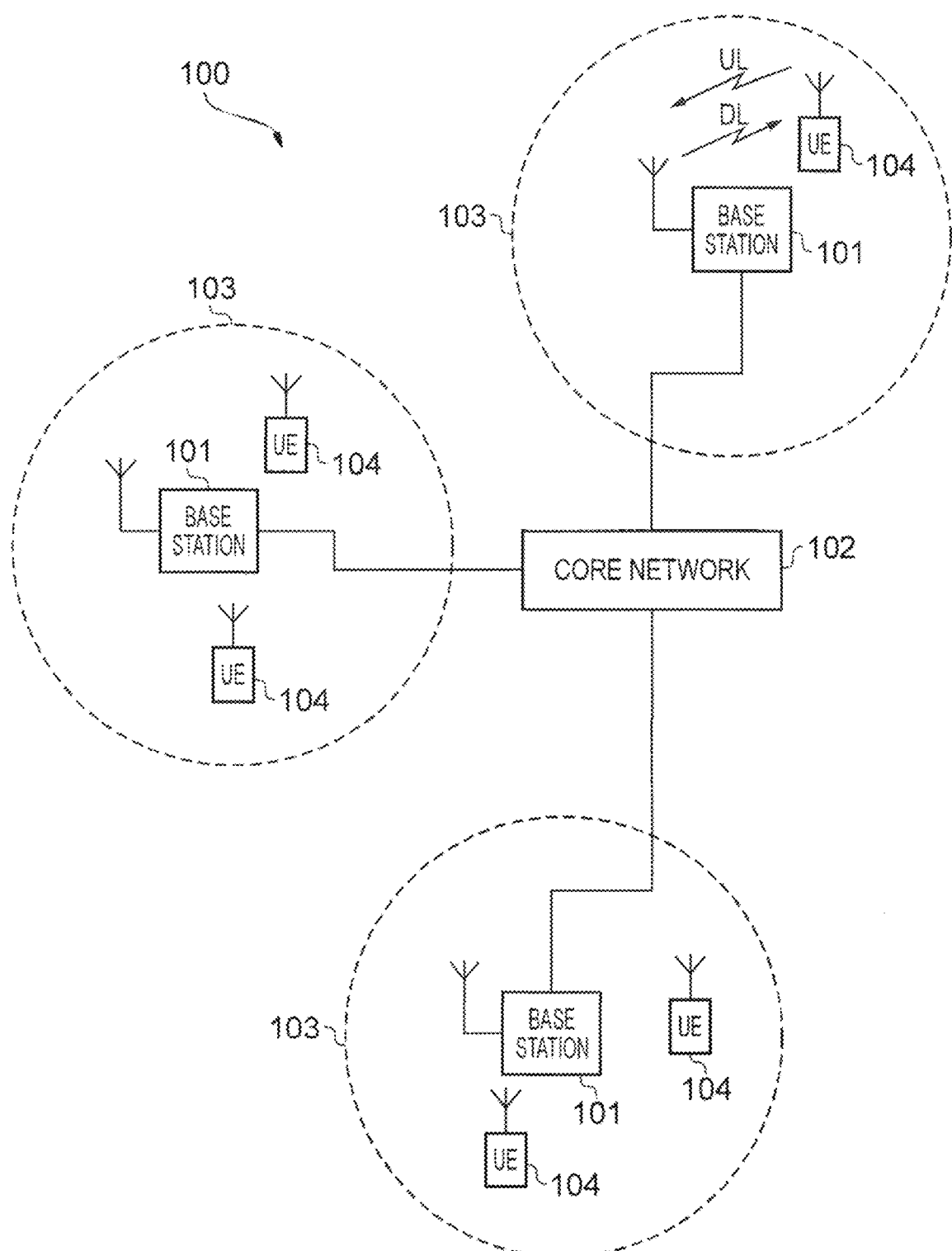
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles but which may also support other radio access technologies and which may implement embodiments of the disclosure as described herein. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards and previously proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations, nodeBs, e-nodeBs, eNB, g-nodeBs, gNB and so forth.

Figure 2:
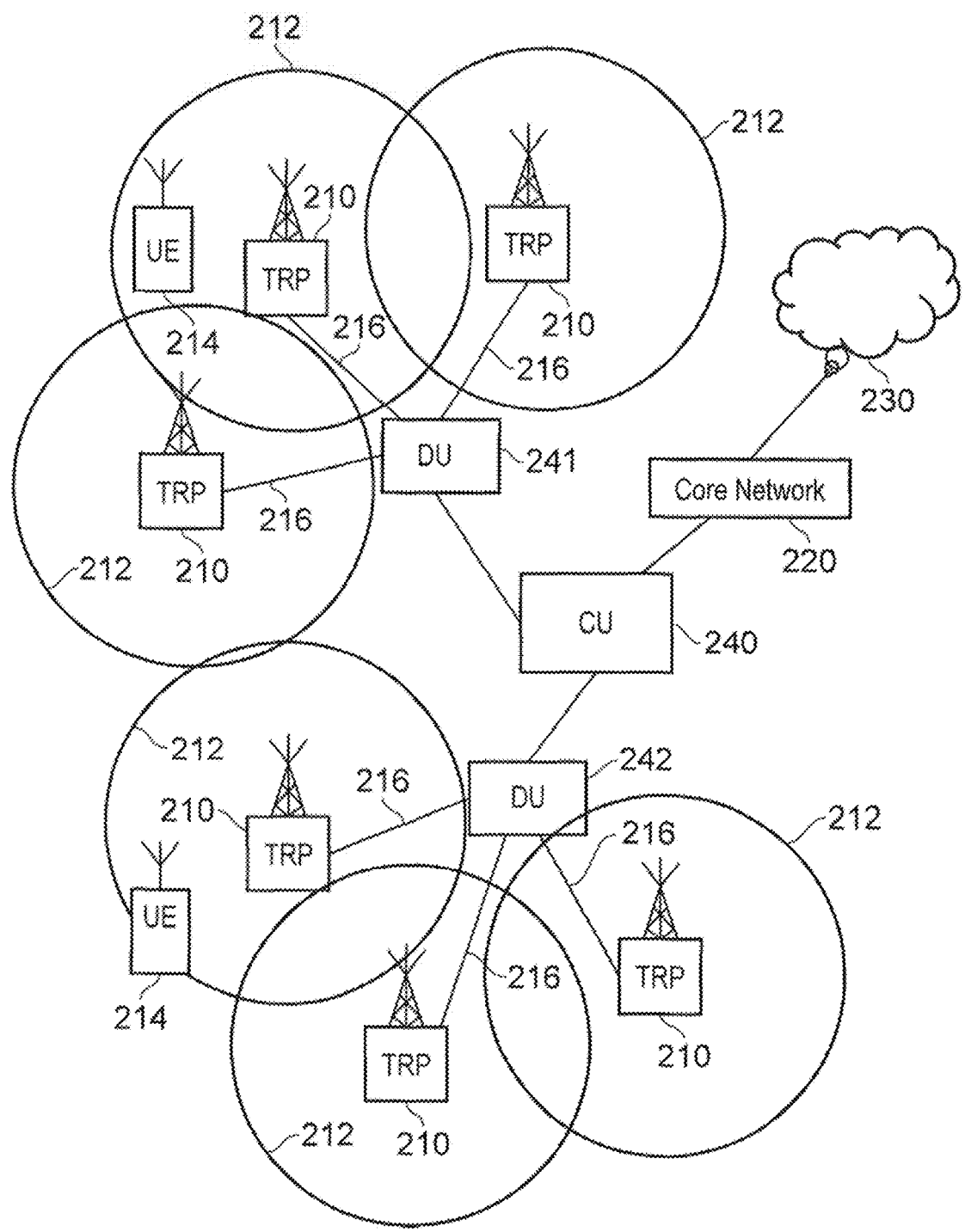
FIG. 2 is a schematic block diagram illustrating an example of a mobile telecommunication system with architectural components corresponding to that of an enhanced New Radio (NR) or 5G network.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 210 are connected to distributed control units (DUs) 241, 242 by a connection interface represented as a line 216. Each of the TRPs 210 is arranged to transmit and receive signals via a wireless access interface within a radio frequency bandwidth available to the wireless communications network. Thus within a range for performing radio communications via the wireless access interface, each of the TRPs 210, forms a cell of the wireless communications network as represented by a dashed line 212. As such wireless communications devices 214 which are within a radio communications range provided by the cells 210 can transmit and receive signals to and from the TRPs 210 via the wireless access interface. Each of the distributed control units 241, 242 are connected to a central unit (CU) 240 via an interface. The central unit 240 is then connected to the a core network 220 which may contain all other functions required to transmit data for communicating to and from the wireless communications devices and the core network 220 may be connected to other networks 230.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB of an LTE network. Similarly the communications devices 214 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

In LTE, the frame structure for the transmissions is fixed, thereby fixing the number of subframes/slots that are used for the downlink (or uplink), the locations of the Reference Signals (RS) and duration (in time) of a transmission. In NR, a flexible frame/subframe structure is expected to cater for the diverse applications (see for example the eMBB and URLLC mentioned above). Some OFDM symbols in a slot/subframe may be blank or contain only reference symbols (RS). The duration of a transmission can also be variable: the transmission can occupy multiple mini-slots, where several mini-slots are aggregated. A mini-slot is a structure in the time domain that occupies fewer resources than a slot. For example, a mini-slot can occupy one OFDM symbol or 2 OFDM symbols, and so on. Given such slot flexibility, it is proposed in [3] that a layer 1 broadcast control channel (L1-BCCH) is used to communicate the slot structure to multiple UEs at the beginning of the slot. Examples of elements of the slot structure that can be signalled include which OFDM symbols are used in the downlink or uplink, whether the slot contains blank durations, and so forth. While some of the details of this L1-BCCH channel are still under discussion, it is expected that this channel will be transmitted in 5G networks.

Figure 3:
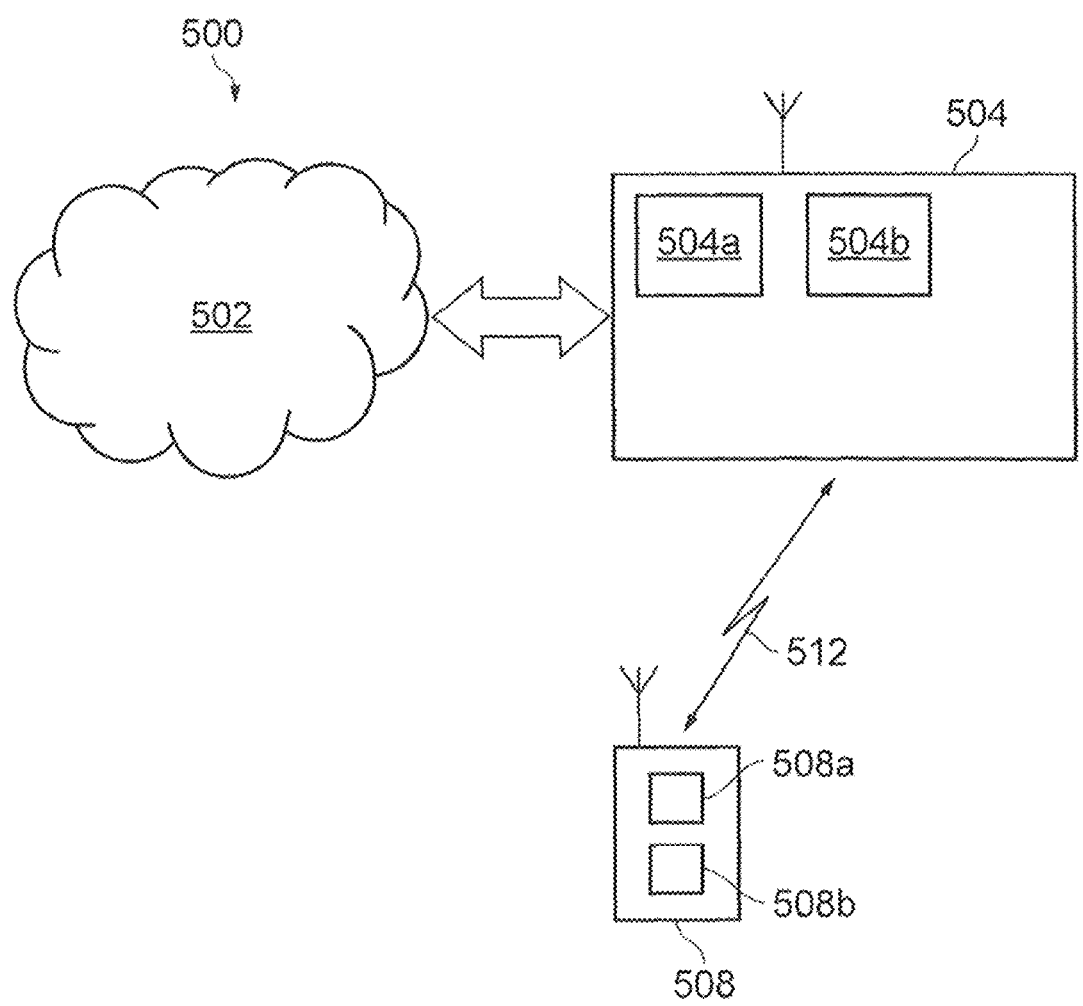
FIG. 3 schematically represents some aspects of a wireless telecommunications network configured to operate in accordance with certain embodiments of the present disclosure.

FIG. 3 schematically shows some further details of a telecommunications system 500 according to an embodiment of the present disclosure. The telecommunications system 500 in this example is based broadly around an LTE-type architecture and the telecommunications system may also support other radio access technologies, either using the same hardware as represented in FIG. 3 with appropriately configured functionality or separate hardware configured to operate in association with the hardware represented in FIG. 3. Many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards and other proposals for operating wireless telecommunications systems.

The telecommunications system 500 comprises a core network part (evolved packet core) 502 coupled to a radio network part. The radio network part comprises a base station (evolved-nodeB) 504 coupled to a terminal device 508. In this example, only one base station 504 and one terminal device 508 are represented in FIG. 3. However, it will of course be appreciated that in practice the radio network part will typically comprise a plurality of base stations serving a larger number of terminal devices across various communication cells, as well as potentially including transceiver stations supporting radio communications with terminal devices on cells operating in accordance with other radio access technologies, such as UTRAN, GERAN, WLAN or a 5G new RAT. However, only a single base station and terminal device are shown in FIG. 3 in the interests of simplicity.

The terminal device 508 is arranged to communicate data to and from the base station (transceiver station) 504. The base station is in turn communicatively connected to a serving gateway, S-GW, (not shown) in the core network part which is arranged to perform routing and management of mobile communications services to the terminal device in the telecommunications system 500 via the base station 504. In order to maintain mobility management and connectivity, the core network part 502 also includes a mobility management entity, MME, (not shown) which manages the enhanced packet service, EPS, connections with the terminal device 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 3 may be conventional apart from where modified to provide functionality in accordance with embodiments of the present disclosure as discussed herein. It will be appreciated embodiments of the invention may in general be implemented in wireless communications systems operating in accordance with different radio access technologies, for example, who one or more of UTRAN, GERAN, WLAN or a 5G new RAT (NR) networks, and these other radio access technologies will not necessarily incorporate the same network infrastructure components as for an LTE implementation (e.g. there may be no serving gateway in new RAT networks).

The terminal device 508 is adapted to support operations in accordance with embodiments of the present disclosure when communicating with the base station 504 as discussed further herein. The terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508a are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 3 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality, such as a scheduler. For example, although not shown in FIG. 3 for simplicity, the processor circuitry 504b may comprise scheduling circuitry, that is to say the processor circuitry 504b may be configured/programmed to provide the scheduling function for the base station 504.

It has been proposed that a wireless communications interface provided to a future wireless communications network may be operating with high frequency carriers such as those within a millimetre waveband, for example with a large frequency range between 20 GHz and 100 GHz to enable a large frequency bandwidth, for example with a few hundred MHz to 1 GHz, to be used offering very high throughput for eMBB services and support large capacity.

Figure 4:
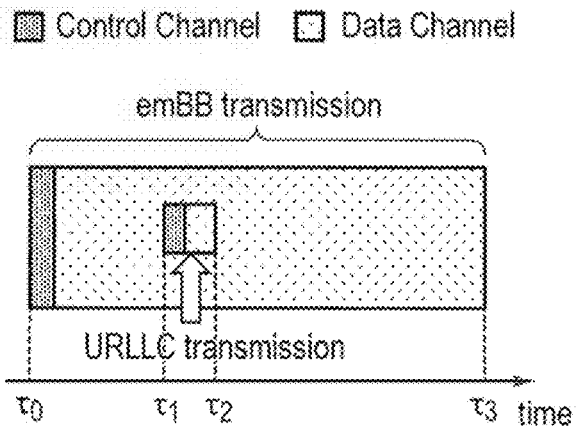
FIG. 4 schematically represents an example of a collision between two downlink transmissions.

FIG. 4 illustrates an example of a collision between a URLLC transmission and eMBB data. In this example, if the eMBB data for a terminal is corrupted by the urgent URLLC transmissions, the terminal may have to wait for the next eMBB subframe to receive the corrupted data. The skilled person is again directed to applications EP16189083.5 filed 15 Sep. 2016, EP16191978.2 filed 30 Sep. 2016, EP16191997.2 filed 30 Sep. 2016 and EP 16198538.7 filed 11 Nov. 2016 which can provide assistance with such a situation.

Figure 5:
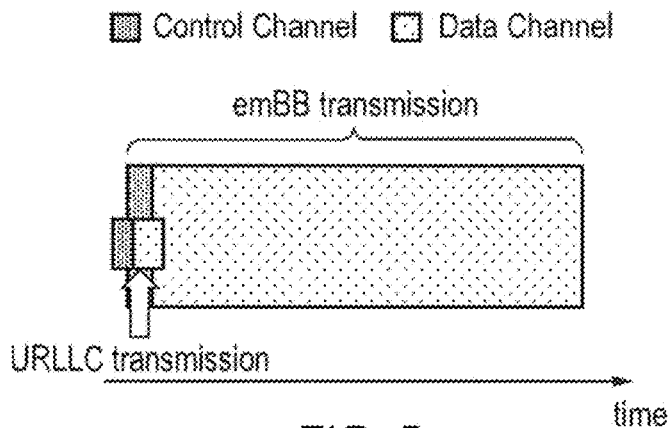
FIG. 5 schematically represents an example of another collision between two downlink transmissions.

FIG. 5 illustrates another example of a collision between a URLLC transmission and an eMBB transmission that may also have significant consequences on the terminals' ability to receive eMBB data. In particular, in this case, the URLLC transmission collides with the control portion (also sometimes referred to as control channel) of the eMBB subframe. This control portion includes in particular resource allocation information which enables the terminals to identify in which eMBB resources they can find downlink data transmitted to them and/or in which eMBB resources they may transmit uplink data. Also, in addition to allocation/scheduling information, the control channel can also provide additional control information such as acknowledgement information (for example HARQ feedback) regarding previous uplink transmissions from the terminal. As a result, affecting acknowledgement information would have a negative impact on HARQ transmission as well as a knock-on effect on uplink transmissions as the terminal would then have to re-send the uplink data until a positive acknowledgment is received. This would result in a higher use of resources and cause delays in the transmissions.

The following description considers issues related to collisions in the control portion that affect downlink data transmissions. As the skilled person will appreciate, collisions in the control portion may also affect the ability of a terminal to use uplink resources assigned by the control portion. For the sake of brevity, consequences associated with downlink data transmissions only are discussed but the same teachings apply when the collision affects an uplink resources allocation.

As a result, a larger number of terminals are likely to be affected by such a collision and the consequences are likely to be larger. In particular, if a terminal is affected, the terminal will most likely not be able to decode any of the downlink data transmitted to it (rather than potentially only a portion of this downlink data if the collision affects only the data and not the control information).

It would thus be desirable to have techniques which can assist in reducing the negative impact of a collision between a URLLC transmission and a control portion of an eMBB transmission.

In accordance with the present disclosure, there is provided an arrangement wherein downlink control-related information can be transmitted to a terminal in a wireless telecommunications system with a view to minimising the effect of potential collisions between a transmission and a control portion of a downlink transmission. Accordingly, after downlink resources have been allocated in a first set of resources for sending the downlink control-related information, it can be determined that a further downlink transmission will be transmitted using at least part of the allocated downlink resources (whereby a collision between the downlink control-related information transmission and the further downlink transmission can be identified). Upon identifying such a collision, a second set of resources can be allocated for sending the downlink control-related information and the downlink control-related information can be transmitted using at least the second set of resources.

Figure 6:
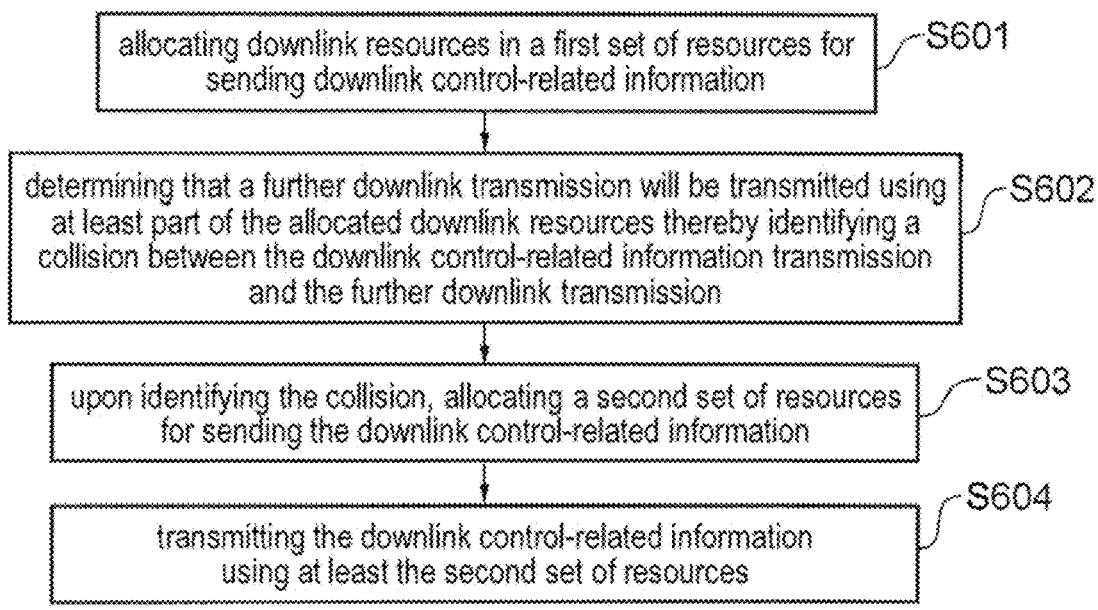
FIG. 6 schematically represents a method in accordance with certain embodiments of the present disclosure.

FIG. 6 illustrates an example method in accordance with the present disclosure wherein the method can be used when a downlink transmission collides with the transmission of control-related information. First, at 5601, the method starts with allocating downlink resources in a first set of resources for sending downlink control-related information. In most cases, this will correspond to a default set of resources for sending the control-related information when there is no collision. Then at 5602, the method continues with determining that a further downlink transmission will be transmitted using at least part of the allocated downlink resources thereby identifying a collision between the downlink control-related information transmission and the further downlink transmission. In some examples the further downlink transmission will be a URLLC or URLLC-like transmission—although the method is not limited to these examples. Then at 5603, upon identifying the collision, the method comprises allocating a second set of resources for sending the downlink control-related information. Finally at 5604, the method includes transmitting the downlink control-related information using at least the second set of resources. As will be further discussed below, in some examples the downlink control information will be sent in the second set of resources only, in the first set and in the second set independently from the transmission in the first set or transmitted jointly, namely using resources from both the first and second set of resources. Accordingly, rather than relying on conventional methods for addressing the transmission corruption (for example using re-transmissions or data correction, if available), the likelihood can be increased that the control-related information—and thus corresponding downlink data and/or acknowledgement data amongst others—can be safely received by the terminal despite the collision with the further downlink transmission.

Figure 7:
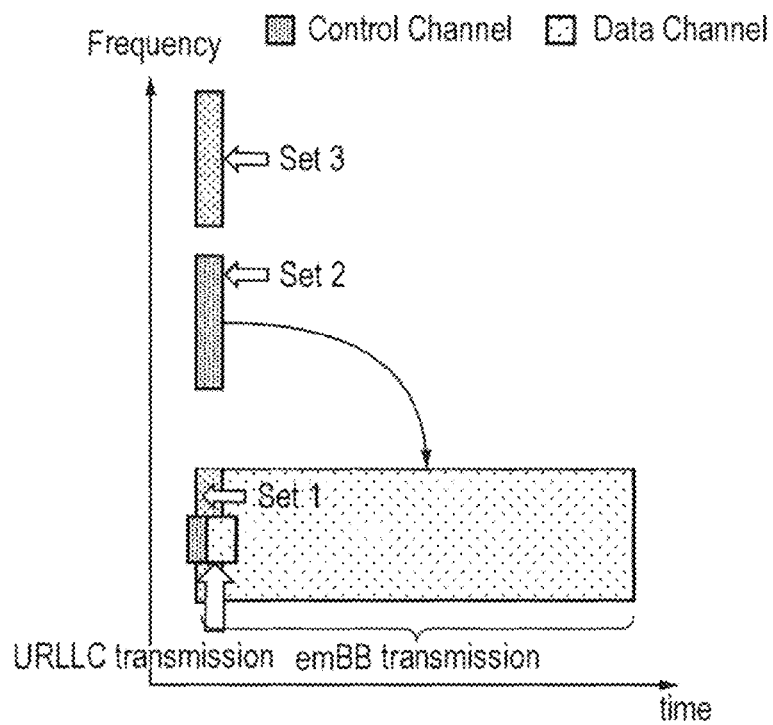
FIG. 7 schematically represents an example technique in accordance with certain embodiments of the present disclosure.

FIG. 7 illustrates a first example implementation of the present disclosure. The control portion of the downlink transmission will be referred to herein as Downlink Control Channel or DCC. As the skilled person will appreciate, the DCC can for example be a PDCCH in LTE or any other suitable portion of the downlink resources that is used for transmitting control information. In this first example, upon detection of the collision, one or more additional sets of resources can be allocated for transmitting the DCC or part of the DCC again. In this example the entire DCC is being sent in the additional alternative set of resources however in other examples only a part of the DCC (e.g. including the part affected by the collision) can be transmitted using additional resources. As illustrated in FIG. 7, when the expected resources used for a DCC transmission (Set 1) are corrupted by URLLC transmission, the base station can transmit the DCC again in another set of resources (Set 2).

In this or in other examples, one or more additional set of resources can be predefined by the gNB, for example they can be indicated to the terminals using RRC signalling. The terminals can be configured either with default locations of the possible alternative sets of resources and/or with information they can use to derive the location of the alternative sets of resources, for example from the location of the original resources affected by the collision. The information can be at least in part pre-configured in the terminal or pre-configured by the base station.

In the present disclosure, when there is no collision, the terminal can monitor the default set (e.g. Set 1 in FIG. 7) only. However, if a collision is otherwise identified, for example with an explicit or implicit indication, the terminal can then use one or more alternative set(s). As will be understood from the present disclosure, the alternative set(s) can be used instead of the original set of resources or in combination with it.

It should also be appreciated that in some examples, a set of resources for control-related information can be a search space consisting of multiple Physical Downlink Control Channel (PDCCH, or equivalent) candidates where the UE would blindly decode the search space in an attempt to identify possible Downlink Control Information (DCI or equivalent) carried by a PDCCH.

As illustrated in FIG. 7, the additional resources that can be used in case there is a collision can be provided in different frequency resources. For example, three sets of alternative resources (Set 1-Set 3) can be configured for each control channel monitoring period, where Set 1 is the default set that will be the sole set in use if there is no collision. The UE would therefore expect the control channel to arrive in Set 1 in a conventional situation. If however the default set Set 1 is corrupted by one or more URLLC transmissions, once the terminal can detect (e.g. by being explicitly or implicitly informed) the collision, it can monitor Set 2 for downlink control channels for example for finding a DCI that schedules an eMBB transmission in a data portion corresponding to the DCC. Likewise, if the resources for the second set Set 2 are compromised or unavailable (for example because of another collision or because the resources are already used for another transmission), the terminal may be able to rely on the third set of resources Set 3 to try to obtain the control-related information from the downlink control channel. The terminal can also be implicitly or explicitly informed that the second set of resources is also corrupted and/or not available for the transmission of control-related information.

In this example, the different sets of alternative resources Sets 2, 3 are in different frequency resources to the default set and in the same time resources as the default set but in other examples, they may be provided in different time resources (and in the same or different frequency resources, if appropriate). For example, the different time resources may be different at the granularity of slots, mini-slots and/or OFDM symbols. By delaying the set of alternative resources relative to the default set of resources, this may facilitate the access to the resources (giving for example the terminal the time to identify a corruption and/or the location of the alternative set). It is noteworthy that in a conventional arrangement where the control channel is provided adjacent to the data channel, such an arrangement may also cause some terminals to be unable to receive data (for example the terminal may not be able to ensure that it receives signals in specific time and frequency resources that include downlink data for this terminal because it receives the control information late).

Figure 8:
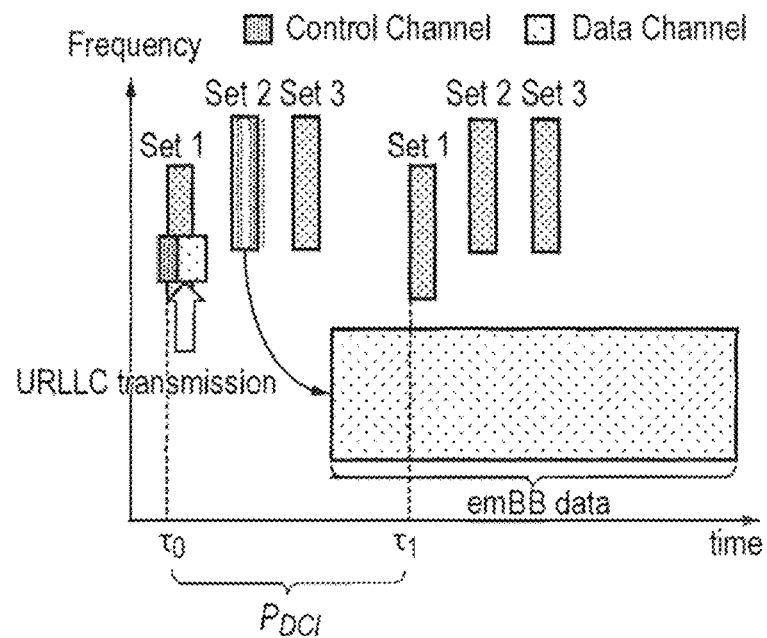
FIG. 8 schematically represents an example technique in accordance with certain embodiments of the present disclosure.

FIG. 8 illustrates an example where there is a gap in time between the default set of resources for transmitting the control information and where the further sets of resources are in different time resources as the default set and are at a time prior to the beginning of the data transmissions. In this example the default set of resources is provided by Set 1 while the alternative set of resources are provided by Set 2 and Set 3. The terminal can monitor for a downlink control channel periodically, for example the $P_{DCI}$ period in this example. The terminal can first monitor the default set of resources, i.e. Set 1 at time to. In this example, it is indicated (implicitly or explicitly) that Set 1 is not used due to corruption and the downlink control channel is delayed to resources in Set 2. The scheduling/allocating information in the downlink control channel in Set 2 schedules the eMBB data transmission. It will be appreciated that the sets of alternative resources, e.g. Set 2 and Set 3, can be in a different frequency range than Set 1 and/or from each other.

Although it is not required for the DCC to be transmitted in frequency resources that do not overlap with the frequency resources for the corresponding data transmissions (as illustrated in the example of FIG. 8), this can enable at least some of the various sets of resources to overlap in time with data transmissions as illustrated in FIG. 8 where the next three sets of resources Set 1-Set 3 can be sent at a time that overlaps with that of the data transmission for the previous three sets of resources.

In the above examples, it was generally assumed that, if the first (default) set of resources for the control channel is corrupted, the control-related information is only transmitted in one of the alternative sets of resources instead. However, in other examples of the present disclosure, this assumption may not apply. For example, the control channel information may be transmitted in the second set of resources but also independently in the first set of resources. This can be beneficial for at least two reasons. First, if some of the control information is not corrupted, it may still be usable by corresponding terminals such that these terminals could use the default set of resources without being actually be affected by the collision. Secondly, it may be that some terminals may be able to recover the control information even after the corruption. In such cases, these terminals would only have to receive the control channel from the default set and would not have to try to receive the second set and/or any further sets to receive the control information.

Therefore in these cases, the control-related information would be transmitted in the first set of resources on one hand, and additionally and separately in at least one of one or more further sets of resources on the other hand.

In another examples, rather than use additional resources to re-transmit the control information, the additional resources may be used to increase the robustness of the transmission of the control information. In some examples, the additional set of resources may be used to increase the transmission's robustness using one or more of the following:

An increased aggregation level for the control information (e.g. an increased aggregation level for the PDCCH candidates). For example, in a case where the default aggregation levels would be {1, 2, 4, 8}, they could be increased to {8, 16, 32} and the additional set of resources can be used to accommodate the additional resources required to increase the repetition levels.

A decrease in code rate of the control information (e.g. for the PDCCH candidates). Accordingly, the level of redundancy could be increased thereby increasing the chances of a terminal to successfully decode the control information despite the collision. Again, the second set of resources—and optionally further set(s)—can be used to accommodate the increase in resources required for sending the same amount of control information.

A different encoding for the control-related information. For example, signal space diversity (SSD), spreading or multiuser superposition transmission (MUST) may be used and may benefit from the additional resources from the second set (and any further sets, if appropriate) of resources.

Accordingly, in these examples the alternative set(s) of resources may not be used in an exclusive manner relative to the first set of resources but are used jointly with the first set thereby enabling an increased robustness for the transmission of the control-related information. For example, if the alternative set of resources is selected to be of the same size as the default set of resources, the combination of the default and alternative sets of resources will have double the amount of resources compared to the default set of resources on its own. The doubling of the number of resources available can for example enable a doubling of the repetition level. In other words, by using the default and alternative sets of resources together, the robustness may be increased thereby decreasing the impact of the collision on the terminals' ability to receive the relevant information.

As the skilled person will appreciate, the change of robustness will result in the terminal having to decode the DCC differently. The terminal may be pre-configured with the fall-back robustness configuration(s) to use in a case of collision and/or may be notified of one or more parameters for the new robustness level or configuration used in view of the detected collision.

Figure 9:
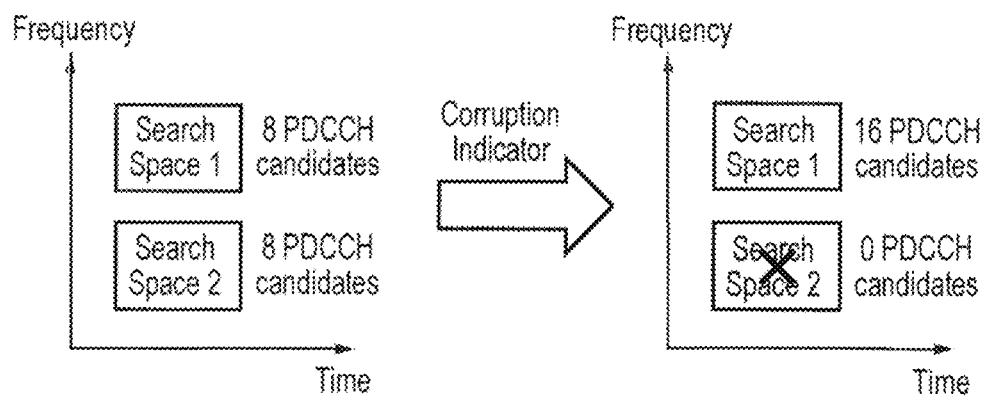
FIG. 9 schematically represents an example technique in accordance with certain embodiments of the present disclosure.

In yet another example, when a further set of resources is already reserved for the transmission of control information, the further set of resources may be used as the "second" set of resources for sending the control information. In other words, the alternative set(s) of resources may not have to be exclusively available for the transmission of the corrupted control information and may be used to transmit other information as well, such as other control information. FIG. 9 illustrates an example implementation using these teachings wherein, when one of two PDCCH candidate search spaces is affected by a collision, the unaffected search space can be used to communicate all PDCCH candidates. In this case, the terminal may be implicitly or explicitly notified (e.g. with a corruption indicator) that the second search space has been corrupted. As a result, rather than being configured to read the two search spaces on the basis that each includes 8 PDCCH candidates (such that the terminal would blind decode 16 candidates), the terminal would instead try to blind decode the first search space only, on the basis that it includes 16 PDCCH candidates (with for example a reduced repetition level). The second search space is not blind decoded as it does not contain any candidates.

It is noteworthy that both in a case where there is no corruption and a case where the candidate distribution is re-arranged using the other search space, the terminal will blind decode the same number of candidates in total, namely 16 in this particular example. In some cases, the redistribution of the candidates can be predetermined: there can for example be a rule that says that if a search space is corrupted, all candidates for that search go to another particular search space 1 (using for example a different aggregation level).

In some cases, not all candidates are being redistributed but only some of the candidates from the corrupted search space are being re-allocated to a different search space. In one illustrative example, if the two search spaces were each supposed to include 8 candidates and if Search Space 1 is corrupted, the redistribution is configured such that Search Space 1 then contains 2 candidates of a relatively high aggregation level whilst Search Space 2 contains the remaining 14 candidates (8 from Search Space 2 and 6 transferred from Search Space 1) at a lower repetition level.

In examples of the present disclosure where there is an explicit indication that one or more sets of resources have been affected by a corruption or collision, such that they are not used for the transmission of control-related information as would be expected in a default configuration, the indication can be provided to the terminal using for example one or more of:

An indication of one or more corrupted set(s);

An indication of one or more set(s) used for transmitting the control-related information, the indication comprising for example any of: time and/or frequency resources location information, an set identifier, a parameter from which the one or more set(s) can be derived;

An indication transmitted to one or more terminals affected by the corruption;

An indication transmitted to all terminals served by the base station;

An indication of the resources used by the colliding transmission;

An indication of a delay for an alternative set of resources;

A robustly encoded channel within the default set that indicates that the default set has been corrupted—likewise, if the second set of resources is corrupted, a robustly encoded channel within one or both of the first and second set may be used to indicate that the second set has been corrupted, and so on; and An indicator signalled in a layer 1 channel such as the L1-BCCH channel (Layer 1 BroadCast CHannel) or equivalent or in any other Layer 1 channel that is in a fixed and known position (such that terminals are expected to always be able to find the indicator if needed.

It is noteworthy that any technically feasible and appropriate combination of the above elements is considered under the present disclosure (although not expressly listed only in the interest of conciseness). For example, the indicator could be signalled in the L1-BCCH and comprise an indicator of a corrupted set and an indicator of an alternative set to use in its place.

In one example, explicit indicators may be used when appropriate but not necessarily on a periodic or regular basis. For example, an explicit indicator may only be used if the default set of DCC resource is not used. For example, in a case where there is no collision with the URLLC transmission, the indicator is not transmitted. As it is expected that URLLC collisions with control information are unlikely to occur on a very regular basis (as the URLLC transmission are smaller and low-latency transmissions whereas eMBB transmissions are high latency and bigger transmissions, such that the size of the control information is small relative to the data), this would reduce the amount of indicator that would be transmitted where there is in fact no collision. In other words, it is expected that the indicator would in most cases indicate that the terminal has to use the default configuration such that it would be useful to dispense of it in such cases.

Figure 10:
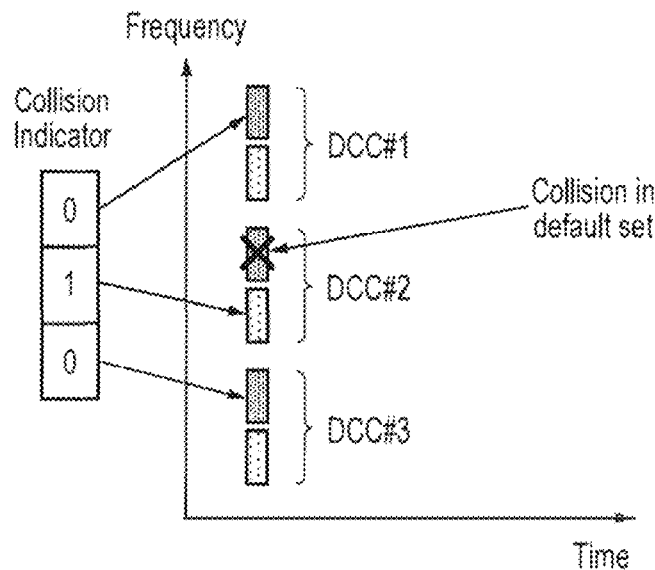
FIG. 10 schematically represents an example technique in accordance with certain embodiments of the present disclosure.

An example of a possible indicator is illustrated with respect to FIG. 10. This indicator is designed as a bitmap of the configured Downlink Control Channels (DCC), where a DCC can be a PDCCH search space.

In this example, three DCCs are configured namely DCC #1, DCC #2 & DCC #3 and each are configured with a default set of resources and with an alternative set of resources. The bitmap can indicate whether a collision has occurred and whether the terminal should use the alternative set of resources wherein the bit position corresponds to a particular DCC. For example, the first bit is for DCC #1, the second for DCC #2 and the third bit for DCC #3. Accordingly, in the example illustrated in FIG. 10, the indicator is set to '010' which can be mapped to DCC #1 and DCC #3 using the default resources and to DCC #2 experiencing a collision such that terminal should use the alternative set of resources for DCC #2. Such an indicator could for example be provided as a separate indicator or field in the L1-BCCH or in any other appropriate channel.

In another example, where there may be more than one alternative set of resources, an indicator could identify one of the alternative sets of resources. If there are for example four sets of resources (one configured as the default set and three as alternative sets), a 2 bit indicator can then be used in respect of such a DCC. Accordingly, the indicator would not only inform the terminal that there is a collision in the default set but it could also inform the terminal of which set it should use in view of the collision. This can provide the base station with additional flexibility in scheduling the DCC and in dealing with incoming urgent transmissions (e.g. URLLC transmissions) and their scheduling.

In another example, an explicit indicator can signal the resources used by URLLC transmission (or more generally used by the colliding transmission). A terminal could then determine whether the indicated resources collide with its default control-related information (e.g. DCC) resources. If it collides, then the terminal can assume that the/an alternative set of resources is used and can monitor the corresponding resources. If the collision or collisions affect multiple sets of resources (e.g. the default set and the first choice for the alternative set), the terminal may then be able to determine which of the affected sets is the least affected and to decide which set to monitor accordingly.

Figure 11:
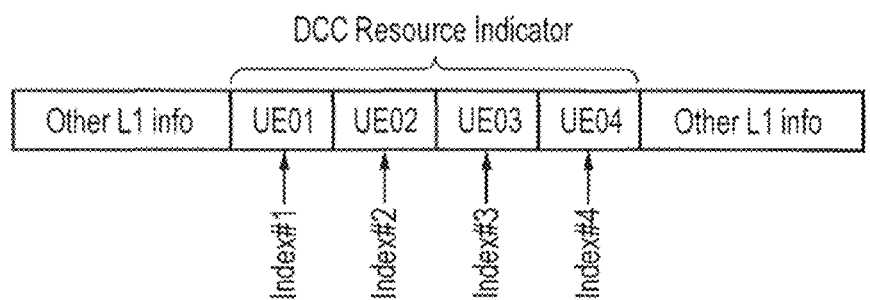
FIG. 11 schematically represents an example technique in accordance with certain embodiments of the present disclosure.

A further illustrative example of an indicator comprises signalling an explicit indicator to each terminal, wherein the terminal is thereby informed of which set of resources it should monitor for the downlink control-related information. It could for example use an arrangement where each terminal is configured with an index which points to the location for this terminal within a field in a broadcast channel (such as the L1-BCCH as shown in FIG. 11). Here, we have four terminals, namely UE01, UE02, UE03 and UE04 which are configured to read a field in a L1-BCCH using indices Index #1, Index #2, Index #3 and Index #4, respectively. Each index points to a position in the DCC Resource Indicator field in the L1-BCCH for one or more terminals. Each terminal will look at its respective DCC Resource Indicator accordingly, for determining the set of resources to monitor for receiving the downlink control information. It should be appreciated that in this example, one or more terminals can share the same set of downlink control resources whereby the terminals can also share the same index for identifying the downlink control resources. This example can also provide the base station with additional scheduling flexibility by allowing the base station to assign different groups of terminal(s) sharing the same set of downlink control resources to look at different alternative resources (even if there is no collision), if deemed appropriate.

In yet another example, an explicit indicator could indicate a delay between the default resources and the alternative resources. Such an indicator may for example be used in the example discussed with respect to FIG. 8.

In a further example, an order of monitoring for the possible sets of resources can be signalled to the terminal so that the terminal can be configured accordingly. For example, the corresponding configuration information may define a default set of resources, as well as one or more further sets of resources in an order of preference. The terminal configured on that basis would first monitor the default set of resources and, if the default set is affected by a collision/corruption, the terminal would monitor a set of resources in the first alternative set following this predefined order. This would provide the base station with more flexibility for the allocation of resources as the order of preference of the various sets can be changed dynamically depending on the circumstances at a point in time.

While the illustrative implementations or aspects discussed above have been discussed in respect of control information that comprises allocation/scheduling information, such as Downlink Control Information (DCI), the present disclosure is not limited to this type of control information. For example and as previously mentioned, the control-related information could be acknowledgement information, such as HARQ signalling. If for example a Physical Hybrid-ARQ Indicator CHannel (PHICH) is affected by a collision, this could also cause large retransmissions that would otherwise not be necessary (if for example a positive acknowledgement was being transmitted but was never received due to the collision). In this case, the terminal would monitor a default PHICH for a HARQ feedback and if a collision is detected (e.g. by the terminal independently and/or indicated to the terminal), the terminal could then monitor an alternative PHICH for HARQ feedback. The teachings of the present disclosure, even if presented in respect of allocation information (e.g. DCI), apply equally to acknowledgement information. Furthermore and as previously discussed, while illustrative implementations discussed herein have generally been discussed in respect collisions in the control portion that affect downlink data transmissions, it will also be appreciated that collisions in the control portion can also affect the ability of the terminal to use uplink resources assigned by grants transmitted in the control portion. Hence the teachings of the present disclosure can also be applied for collisions that affect information (e.g. DCI) allocating uplink resources to a terminal.

While the above discussions of collision detection were mostly in respect of explicit techniques, with the use of an indicator indicating information for identifying a collision and/or one or more sets of resources to be used for monitoring DCC, the present disclosure is not limited to explicit mechanisms. For example implicit mechanisms of indicating or detecting the resources can apply one or more of the techniques and teachings described in EP16198538.7 filed 11 Nov. 2016. In these cases, the terminal can for example perform one or more measurements on the default set of resources. If the terminal determines from these one or more measurements that the default set of resources has been corrupted, the terminal can alternatively monitor another set of resources. For example, EP16198538.7 describes that the colliding (e.g. URLLC) transmission can use a distinct set of reference symbols (distinct from the eMBB transmission) which can assist with the collision detection. According to the present disclosure, if the terminal detected such a set of reference symbols in the default set of resources, or any other implicit indication of collision, it could then monitor the alternative set of resources for obtaining the control resources.

It should be appreciated that transmissions other than URLLC may also collide with downlink control-related information and that the URLLC transmissions have been used as an example only. The skilled person will understand that the teachings of the present disclosure are applicable to any other type of transmission that collides with control related information on the downlink.

Accordingly, there has been provided an arrangement where the impact of a collision between control-related information and a further downlink transmission can be minimised by providing the network and the terminals with techniques which enables them to be more likely to successfully receive the control-related information.

It is noteworthy that while the teachings of the present invention could in theory be applied to collision with downlink data (rather than control-related information), the present disclosure has been designed with a view to addressing the problem of collision with control information as a relatively small collision (in terms of size of resources affected by the collision) could put a very large of amount of data at risk (also in terms of size of resources affected) such that the present disclosure provides teachings which are designed for this particular situation.

As the skilled person will appreciate, when references are made to a set of resources, this does not necessarily require that the resources have to be contiguous in time and/or frequency. For example, an alternative set of resources may comprise two blocks of contiguous resources wherein the blocks are not adjacent to each other in time or in frequency. More generally, any suitable allocation may be used. Adjacent resources may be simpler to configure and allocate but the teachings of the present disclosure are not limited to this particular example.

Some examples of the present disclosure are discussed in the numbered paragraphs below.

Paragraph 1. A method of transmitting downlink control-related information to a terminal in a wireless telecommunications system, the method comprising:
allocating downlink resources in a first set of resources for sending the downlink control-related information;
determining that a further downlink transmission will be transmitted using at least part of the allocated downlink resources thereby identifying a collision between the downlink control-related information transmission and the further downlink transmission;
upon identifying a collision, allocating a second set of resources for sending the downlink control-related information;
transmitting the downlink control-related information using at least the second set of resources.

Paragraph 2. The method of Paragraph 1 wherein the terminal is pre-configured with information identifying the first set of resources and with information identifying the second set of resources.

Paragraph 3. The method of Paragraph 1 or 2, wherein transmitting the downlink control-related information comprises
transmitting the downlink control-related information in the first set of resources; and separately transmitting the downlink control-related information in the second set of resources.

Paragraph 4. The method of Paragraph 1 or 2 wherein transmitting the downlink control-related information comprises transmitting the downlink control-related information in the second set of resources only.

Paragraph 5. The method of Paragraph 3 or 4 further comprising
the terminal detecting that it is unable to receive the downlink control-related information in the first set of resources and
upon detecting, the terminal attempting to receive the downlink control-related information in the second set of resources.

Paragraph 6. The method of Paragraph 5 further comprising
the terminal attempting to receive downlink control-related information from the first set of resources; and
upon determining that the attempt to receive the downlink control-related information is unsuccessful,
the terminal detecting that it is unable to receive the downlink control-related information in the first set of resources.

Paragraph 7. The method of any of Paragraphs 3 to 6 further comprising
transmitting to at least the terminal a notification that the downlink control-related information in the first set of resources is affected by a collision.

Paragraph 8. The method of Paragraph 7 wherein the notification comprises one or more of:
an indication that downlink control-related information is not transmitted in the first set of resources;
frequency information for the second set of resources;
timing information for the second set of resources;
an identifier for the second set of resources;
an indication of the resources of the first set of resources affected by the collision; and
an indication of the resources used for the further downlink transmission.

Paragraph 9. The method of Paragraph 7 or 8 wherein the method comprises
identifying a group of one or more terminals for which the downlink control-related information is affected by the collision;
wherein the at least the terminal comprises the group of one or more terminals.

Paragraph 10. The method of any of Paragraphs 7 to 9 further comprising, upon receiving the notification, the terminal detecting that it is unable to receive the downlink control-related information in the first set of resources.

Paragraph 11. The method of Paragraph 1, wherein transmitting the downlink control-related information comprises transmitting the downlink control-related information in the first set of resources and the second set of resources jointly, with a different transmission robustness relative to the default robustness applied in the first set of resources.

Paragraph 12. The method of Paragraph 11 further comprising:
transmitting a notification indicating that the downlink control-related information is transmitted in the first and second sets of resources jointly and/or the different transmission robustness for the transmission of the downlink control-related information; and
upon receipt of the notification, the terminal attempting to receive the downlink control-related information using the first and second sets of resources jointly.

Paragraph 13. The method of Paragraph 11 further comprising:
upon detecting that it is unable to decode the downlink control-related information using the first set of resources, the terminal attempting to decode the downlink control-related information using the first and second sets of resources jointly.

Paragraph 14. The method of any of Paragraphs 11 to 13 wherein the robustness is increased using one or more of:
an increase aggregation level;
a reduced code rate;
a different type of encoding.

Paragraph 15. The method of Paragraph 1, further comprising
upon identifying the collision, selecting as the second set of resources a further set of resources already reserved for the transmission of further downlink control-related information;

transmitting the downlink control-related information and the further downlink control-related information in the further set of resources.

Paragraph 16. The method of Paragraph 15 comprising the terminal detecting that it is unable to receive the downlink control-related information in the first set of resources and, upon detecting, attempting to receive the downlink control-related information, and optionally the further downlink control-related information, in the further set of resources Paragraph 17. The method of any of Paragraphs 1 to 16 wherein the second set of resources is at a different time period and/or different frequencies than the first set of resources.

Paragraph 18. The method of any of Paragraphs 1 to 17 wherein the downlink control-related information comprises one or more of: allocation information, downlink control information "DCI" and acknowledgement information.

Paragraph 19. A wireless telecommunications system for transmitting downlink control-related information to a terminal, system being configured to:
allocate downlink resources in a first set of resources for sending the downlink control-related information;
determine that a further downlink transmission will be transmitted using at least part of the allocated downlink resources thereby identifying a collision between the downlink control-related information transmission and the further downlink transmission;
allocate, upon identifying a collision, a second set of resources for sending the downlink control-related information;
transmit the downlink control-related information using at least the second set of resources.

Paragraph 20. The system of Paragraph 19 wherein the terminal is pre-configured with information identifying the first set of resources and with information identifying the second set of resources.

Paragraph 21. The system of Paragraph 19 or 20, wherein transmitting the downlink control-related information comprises
transmitting the downlink control-related information in the first set of resources; and separately transmitting the downlink control-related information in the second set of resources.

Paragraph 22. The system of Paragraph 19 or 20 wherein transmitting the downlink control-related information comprises transmitting the downlink control-related information in the second set of resources only.

Paragraph 23. The system of Paragraph 21 or 22 further comprising
the terminal detecting that it is unable to receive the downlink control-related information in the first set of resources and
upon detecting, the terminal attempting to receive the downlink control-related information in the second set of resources.

Paragraph 24. The system of Paragraph 23 further comprising
the terminal attempting to receive downlink control-related information from the first set of resources; and
upon determining that the attempt to receive the downlink control-related information is unsuccessful, the terminal detecting that it is unable to receive the downlink control-related information in the first set of resources.

Paragraph 25. The system of any of Paragraphs 21 to 24 further comprising
transmitting to at least the terminal a notification that the downlink control-related information in the first set of resources is affected by a collision.

Paragraph 26. The system of Paragraph 25 wherein the notification comprises one or more of:
an indication that downlink control-related information is not transmitted in the first set of resources; frequency information for the second set of resources;
timing information for the second set of resources;
an identifier for the second set of resources;
an indication of the resources of the first set of resources affected by the collision; and
an indication of the resources used for the further downlink transmission.

Paragraph 27. The system of Paragraph 25 or 26 wherein the method comprises identifying a group of one or more terminals for which the downlink control-related information is affected by the collision;
wherein the at least the terminal comprises the group of one or more terminals.

Paragraph 28. The system of any of Paragraphs 25 to 27 further comprising, upon receiving the notification, the terminal detecting that it is unable to receive the downlink control-related information in the first set of resources.

Paragraph 29. The system of Paragraph 19, wherein transmitting the downlink control-related information comprises transmitting the downlink control-related information in the first set of resources and the second set of resources jointly, with a different transmission robustness relative to the default robustness applied in the first set of resources.

Paragraph 30. The system of Paragraph 29 further comprising:
transmitting a notification indicating that the downlink control-related information is transmitted in the first and second sets of resources jointly and/or the different transmission robustness for the transmission of the downlink control-related information; and
upon receipt of the notification, the terminal attempting to receive the downlink control-related information using the first and second sets of resources jointly.

Paragraph 31. The system of Paragraph 29 further comprising:
upon detecting that it is unable to decode the downlink control-related information using the first set of resources, the terminal attempting to decode the downlink control-related information using the first and second sets of resources jointly.

Paragraph 32. The system of any of Paragraphs 29 to 31 wherein the robustness is increased using one or more of:
an increase aggregation level;
a reduced code rate;
a different type of encoding.

Paragraph 33. The system of Paragraph 19, further comprising
upon identifying the collision, selecting as the second set of resources a further set of resources already reserved for the transmission of further downlink control-related information;
transmitting the downlink control-related information and the further downlink control-related information in the further set of resources.

Paragraph 34. The system of Paragraph 33 comprising the terminal detecting that it is unable to receive the downlink control-related information in the first set of resources and, upon detecting, attempting to receive the downlink control-related information, and optionally the further downlink control-related information, in the further set of resources Paragraph 35. The system of any of Paragraphs 19 to 34 wherein the second set of resources is at a different time period and/or different frequencies than the first set of resources.

Paragraph 36. The system of any of Paragraphs 19 to 35 wherein the downlink control-related information comprises one or more of: allocation information, downlink control information "DCI" and acknowledgement information.

Paragraph 37. A wireless telecommunications system for transmitting downlink control-related information to a terminal, the system being configured to implement the method of any of Paragraphs 1 to 18.

Paragraph 38. A method of operating a base station in a wireless telecommunications system for transmitting downlink control-related information to a terminal, the method comprising the base station:
allocating downlink resources in a first set of resources for sending the downlink control-related information;
determining that a further downlink transmission will be transmitted using at least part of the allocated downlink resources thereby identifying a collision between the downlink control-related information transmission and the further downlink transmission;
upon identifying a collision, allocating a second set of resources for sending the downlink control-related information;
transmitting the downlink control-related information using at least the second set of resources.

Paragraph 39. The method of Paragraph 38 wherein the terminal is pre-configured with information identifying the first set of resources and with information identifying the second set of resources.

Paragraph 40. The method of Paragraph 38 or 39, wherein transmitting the downlink control-related information comprises
transmitting the downlink control-related information in the first set of resources; and separately transmitting the downlink control-related information in the second set of resources.

Paragraph 41. The method of Paragraph 38 or 39 wherein transmitting the downlink control-related information comprises transmitting the downlink control-related information in the second set of resources only.

Paragraph 42. The method of Paragraph 40 or 41 further comprising
transmitting to at least the terminal a notification that the downlink control-related information in the first set of resources is affected by a collision.

Paragraph 43. The method of Paragraph 42 wherein the notification comprises one or more of:
an indication that downlink control-related information is not transmitted in the first set of resources;
frequency information for the second set of resources;
timing information for the second set of resources;
an identifier for the second set of resources;
an indication of the resources of the first set of resources affected by the collision; and
an indication of the resources used for the further downlink transmission.

Paragraph 44. The method of Paragraph 42 or 43 wherein the method comprises identifying a group of one or more terminals for which the downlink control-related information is affected by the collision;
wherein the at least the terminal comprises the group of one or more terminals.

Paragraph 45. The method of Paragraph 38, wherein transmitting the downlink control-related information comprises transmitting the downlink control-related information in the first set of resources and second set of resources jointly with a different transmission robustness relative to the default robustness applied in the first set of resources.

Paragraph 46. The method of Paragraph 45 further comprising:
transmitting a notification indicating that the downlink control-related information is transmitted in the first and second sets of resources jointly and/or the different transmission robustness for the transmission of the downlink control-related information.

Paragraph 47. The method of Paragraph 45 or 46 wherein the robustness is increased using one or more of:
an increase aggregation level;
a reduced code rate;
a different type of encoding.

Paragraph 48. The method of Paragraph 38, further comprising
upon identifying the collision, selecting as the second set of resources a further set of resources already reserved for the transmission of further downlink control-related information;
transmitting the downlink control-related information and the further downlink control-related information in the further set of resource.

Paragraph 49. The method of any of Paragraphs 38 to 48 wherein the second set of resources is at a different time period and/or different frequencies than the first set of resources.

Paragraph 50. The method of any of Paragraphs 38 to 49 wherein the downlink control-related information comprises one or more of: allocation information, downlink control information "DCI" and acknowledgement information.

Paragraph 51. A base station for transmitting downlink control-related information to a terminal in a wireless telecommunications system, the base station being configured to:
allocate downlink resources in a first set of resources for sending the downlink control-related information;
determine that a further downlink transmission will be transmitted using at least part of the allocated downlink resources thereby identifying a collision between the downlink control-related information transmission and the further downlink transmission;
allocate, upon identifying a collision, a second set of resources for sending the downlink control-related information;
transmit the downlink control-related information using at least the second set of resources.

Paragraph 52. The base station of Paragraph 51, wherein the base station being configured to transmit the downlink control-related information comprises the base station being configured to transmit the downlink control-related information in the first set of resources; and
separately transmit the downlink control-related information in the second set of resources.

Paragraph 53. The base station of Paragraph 51 wherein the base station being configured to transmit the downlink control-related information comprises the base station being configured to transmit the downlink control-related information in the second set of resources only.

Paragraph 54. The base station of Paragraph 52 or 53 further configured to transmit to at least the terminal a notification that the downlink control-related information in the first set of resources is affected by a collision.

Paragraph 55. The base station of Paragraph 54 wherein the notification comprises one or more of:

an indication that downlink control-related information is not transmitted in the first set of resources;
frequency information for the second set of resources;
timing information for the second set of resources;
an identifier for the second set of resources;
an indication of the resources of the first set of resources affected by the collision; and
an indication of the resources used for the further downlink transmission.

Paragraph 56. The base station of Paragraph 54 or 55 further configured to identify a group of one or more terminals for which the downlink control-related information is affected by the collision;
wherein the at least the terminal comprises the group of one or more terminals.

Paragraph 57. The base station of Paragraph 51, wherein the base station being configured to transmit the downlink control-related information comprises the base station being configured to transmit the downlink control-related information in the first set of resources and second set of resources jointly with a different transmission robustness relative to the default robustness applied in the first set of resources.

Paragraph 58. The base station of Paragraph 57 further configured to:
transmit a notification indicating that the downlink control-related information is transmitted in the first and second sets of resources jointly and/or the different transmission robustness for the transmission of the downlink control-related information.

Paragraph 59. The base station of Paragraph 57 or 58 wherein the robustness is increased using one or more of:
an increase aggregation level;
a reduced code rate;
a different type of encoding.

Paragraph 60. The base station of Paragraph 51, further configured to
select, upon identifying the collision, as the second set of resources a further set of resources already reserved for the transmission of further downlink control-related information;
transmit the downlink control-related information and the further downlink control-related information in the further set of resource.

Paragraph 61. The base station of any of Paragraphs 51 to 60 wherein the second set of resources is at a different time period and/or different frequencies than the first set of resources.

Paragraph 62. The base station of any of Paragraphs 51 to 61 wherein the downlink control-related information comprises one or more of: allocation information, downlink control information "DCI" and acknowledgement information.

Paragraph 63. A base station for transmitting downlink control-related information in a wireless telecommunications system, the base station being configured to implement the method of any of Paragraphs 38 to 50.

Paragraph 64. Circuitry for a base station for transmitting downlink control-related information in a wireless telecommunications system, wherein the circuitry comprises a controller element and a transceiver element configured to operate together to:
allocate downlink resources in a first set of resources for sending the downlink control-related information;
determine that a further downlink transmission will be transmitted using at least part of the allocated downlink resources thereby identifying a collision between the downlink control-related information transmission and the further downlink transmission;
allocate, upon identifying a collision, a second set of resources for sending the downlink control-related information;
transmit the downlink control-related information using at least the second set of resources.

Paragraph 65. Circuitry for a base station for transmitting downlink control-related information in a wireless telecommunications system, wherein the circuitry comprises a controller element and a transceiver element configured to operate together to implement the method of any of Paragraphs 38 to 50.

Paragraph Terminal

Paragraph 66. A method of operating a terminal in a wireless telecommunications system for receiving downlink control-related information, the method comprising the terminal:
identifying downlink resources in a first set of resources for receiving the downlink control-related information;
identifying a collision between the downlink control-related information transmission and a further downlink transmission in the first set of resources;
upon identification of the collision, identifying a second set of resources for receiving the downlink control-related information;
receiving the downlink control-related information using at least the second set of resources.

Paragraph 67. The method of Paragraph 64 wherein the terminal is pre-configured with information identifying the first set of resources and with information identifying the second set of resources.

Paragraph 68. The method of Paragraph 64 or 65 further comprising
the terminal detecting that it is unable to receive the downlink control-related information in the first set of resources and
upon detecting, the terminal attempting to receive the downlink control-related information in the second set of resources.

Paragraph 69. The method of Paragraph 66 further comprising
the terminal attempting to receive downlink control-related information from the first set of resources; and
upon determining that the attempt to receive the downlink control-related information is unsuccessful, the terminal detecting that it is unable to receive the downlink control-related information in the first set of resources.

Paragraph 70. The method of any of Paragraphs 64 to 67 further comprising
receiving a notification that the downlink control-related information in the first set of resources is affected by a collision, wherein the notification is transmitted to at least the terminal.

Paragraph 71. The method of Paragraph 68 wherein the notification comprises one or more of:
an indication that downlink control-related information is not transmitted in the first set of resources;
frequency information for the second set of resources;
timing information for the second set of resources;
an identifier for the second set of resources;
an indication of the resources of the first set of resources affected by the collision; and
an indication of the resources used for the further downlink transmission.

Paragraph 72. The method of Paragraph 68 or 69 further comprising, upon receiving the notification, the terminal detecting that it is unable to receive the downlink control-related information in the first set of resources.

Paragraph 73. The method of Paragraph 64, wherein receiving the downlink control-related information comprises receiving the downlink control-related information in the first set of resources and second set of resources jointly with a different transmission robustness relative to the robustness applied in the first set of resources.

Paragraph 74. The method of Paragraph 71 further comprising:
receiving a notification indicating that the downlink control-related information is transmitted in the first and second sets of resources jointly and/or the different transmission robustness for the transmission of the downlink control-related information; and
upon receipt of the notification, the terminal attempting to receive the downlink control-related information using the first and second sets of resources jointly.

Paragraph 75. The method of Paragraph 71 further comprising:
the terminal, upon detecting that it is unable to decode the downlink control-related information using the first set of resources, attempting to decode the downlink control-related information using the first and second sets of resources jointly.

Paragraph 76. The method of any of Paragraphs 71 to 73 wherein the robustness is increased using one or more of:
an increase aggregation level;
a reduced code rate;
a different type of encoding.

Paragraph 77. The method of Paragraph 64, further comprising the terminal detecting that it is unable to receive the downlink control-related information in the first set of resources and,
upon detecting, attempting to receive the downlink control-related information, and optionally further downlink control-related information, in the second set of resources wherein the second set of resources corresponds to resources already allocated for transmitting the further downlink control-related information.

Paragraph 78. The method of any of Paragraphs 64 to 75 wherein the second set of resources is at a different time period and/or different frequencies than the first set of resources.

Paragraph 79. The method of any of Paragraphs 64 to 76 wherein the downlink control-related information comprises one or more of: allocation information, downlink control information "DCI" and acknowledgement information.

Paragraph 80. A terminal for receiving downlink control-related information in a wireless telecommunications system, the terminal being configured to:
identify downlink resources in a first set of resources for receiving the downlink control-related information;
identify a collision between the downlink control-related information transmission and a further downlink transmission in the first set of resources;
identify, upon identification of the collision, a second set of resources for receiving the downlink control-related information;
receive the downlink control-related information using at least the second set of resources.

Paragraph 81. The terminal of Paragraph 78 wherein the terminal is pre-configured with information identifying the first set of resources and with information identifying the second set of resources.

Paragraph 82. The terminal of Paragraph 78 or 79 further configured to detect that it is unable to receive the downlink control-related information in the first set of resources and attempt, upon detecting, to receive the downlink control-related information in the second set of resources.

Paragraph 83. The terminal of Paragraph 80 further configured to
attempt to receive downlink control-related information from the first set of resources; and
detect, upon determining that the attempt to receive the downlink control-related information is unsuccessful, that it is unable to receive the downlink control-related information in the first set of resources.

Paragraph 84. The terminal of any of Paragraphs 78 to 81 further configured to receive a notification that the downlink control-related information in the first set of resources is affected by a collision, wherein the notification is transmitted to at least the terminal.

Paragraph 85. The terminal of Paragraph 82 wherein the notification comprises one or more of:
an indication that downlink control-related information is not transmitted in the first set of resources; frequency information for the second set of resources;
timing information for the second set of resources;
an identifier for the second set of resources;
an indication of the resources of the first set of resources affected by the collision; and
an indication of the resources used for the further downlink transmission.

Paragraph 86. The terminal of Paragraph 82 or 83 further configured to detect, upon receiving the notification, that it is unable to receive the downlink control-related information in the first set of resources.

Paragraph 87. The terminal of Paragraph 78, wherein receiving the downlink control-related information comprises receiving the downlink control-related information in the first set of resources and second set of resources jointly with a different transmission robustness relative to the robustness applied in the first set of resources.

Paragraph 88. The terminal of Paragraph 85 further comprising:
receiving a notification indicating that the downlink control-related information is transmitted in the first and second sets of resources jointly and/or the different transmission robustness for the transmission of the downlink control-related information; and
upon receipt of the notification, the terminal attempting to receive the downlink control-related information using the first and second sets of resources jointly.

Paragraph 89. The terminal of Paragraph 85 further comprising:
the terminal, upon detecting that it is unable to decode the downlink control-related information using the first set of resources, attempting to decode the downlink control-related information using the first and second sets of resources jointly.

Paragraph 90. The terminal of any of Paragraphs 85 to 87 wherein the robustness is increased using one or more of:
an increase aggregation level;
a reduced code rate;
a different type of encoding.

Paragraph 91. The terminal of Paragraph 78, further configured to
detect that it is unable to receive the downlink control-related information in the first set of resources and,
attempt, upon detecting, to receive the downlink control-related information, and optionally further downlink control-related information, in the second set of resources wherein the second set of resources corresponds to resources already allocated for transmitting the further downlink control-related information.

Paragraph 92. The terminal of any of Paragraphs 78 to 89 wherein the second set of resources is at a different time period and/or different frequencies than the first set of resources.

Paragraph 93. The terminal of any of Paragraphs 78 to 90 wherein the downlink control-related information comprises one or more of: allocation information, downlink control information "DCI" and acknowledgement information.

Paragraph 94. A terminal for receiving downlink control-related information in a wireless telecommunications system, the base station being configured to implement the method of any of Paragraphs 64 to 77.

95. Circuitry for a base station for transmitting downlink control-related information in a wireless telecommunications system, wherein the circuitry comprises a controller element and a transceiver element configured to operate together to:

identify downlink resources in a first set of resources for receiving the downlink control-related information;
identify a collision between the downlink control-related information transmission and a further downlink transmission in the first set of resources;
identify, upon identification of the collision, a second set of resources for receiving the downlink control-related information;
receive the downlink control-related information using at least the second set of resources.

Paragraph 96. Circuitry for a base station for transmitting downlink control-related information in a wireless telecommunications system, wherein the circuitry comprises a controller element and a transceiver element configured to operate together to implement the method of any of Paragraphs 64 to 77.

REFERENCES

[1] Holma H. and Toskala A, "LTE for UMTS OFDMA and SC-FDMA based radio access", John Wiley and Sons, 2009
[2] RP-160671, "New SID Proposal: Study on New Radio Access Technology," NTT DOCOMO, RAN #71
[3] R1-1612062, "Control channel for slot format indicator," Qualcomm Incorporated, RAN1 #87

The invention claimed is:

1. A method, comprising:
    allocating, by a base station in a wireless telecommunications system, downlink resources in a first set of resources for transmission of downlink control-related information to a terminal;
    identifying a collision between the transmission of the downlink control-related information and a further downlink transmission to be transmitted using at least part of the downlink resources;
    allocating, based on identification of the collision, a second set of resources for the transmission of the downlink control-related information;
    transmitting, to at least the terminal, a notification that the transmission of the downlink control-related information in the first set of resources is to be affected by the collision; and
    transmitting the downlink control-related information using at least the second set of resources.

2. The method of claim 1, wherein the terminal is pre-configured with information identifying the first set of resources and the second set of resources.

3. The method of claim 1, wherein the transmitting the downlink control-related information comprises:
    transmitting the downlink control-related information in the first set of resources; and
    separately transmitting the downlink control-related information in the second set of resources.

4. The method of claim 1, wherein transmitting the downlink control-related information comprises transmitting the downlink control-related information in only the second set of resources.

5. The method of claim 1, wherein the notification comprises one or more of:
    an indication that downlink control-related information is not transmitted in the first set of resources;
    frequency information for the second set of resources;
    timing information for the second set of resources;
    an identifier for the second set of resources;
    an indication of the resources of the first set of resources affected by the collision; and
    an indication of the resources used for the further downlink transmission.

6. The method of claim 1, further comprising:
    identifying a group of one or more terminals for which the downlink control-related information is affected by the collision, wherein
    the group of one or more terminals includes the terminal, and
    the at least the terminal comprises the group of one or more terminals.

7. The method of claim 1, wherein the transmitting the downlink control-related information comprises transmitting the downlink control-related information in the first set of resources and second set of resources jointly with a different transmission robustness relative to a default robustness applied in the first set of resources.

8. The method of claim 7, further comprising:
    the notification is transmitted in the first and second sets of resources jointly and/or the different transmission robustness for the transmission of the downlink control-related information.

9. The method of claim 7, wherein the robustness is increased using one or more of:
    an increase aggregation level;
    a reduced code rate; and
    a different type of encoding.

10. The method of claim 1, further comprising:
    upon identifying the collision, selecting as the second set of resources a further set of resources already reserved for the transmission of further downlink control-related information; and
    transmitting the downlink control-related information and the further downlink control-related information in the further set of resource.

11. The method of claim 1, wherein the second set of resources is at a different time period and/or different frequencies than the first set of resources.

12. The method of claim 1, wherein the downlink control-related information comprises one or more of: allocation information, downlink control information "DCI" and acknowledgement information.

13. Circuitry for a base station in a wireless telecommunications system, the circuitry comprising:
    a control circuit; and a transceiver configured to operate together with the control circuit to:
- allocate downlink resources in a first set of resources for transmission of downlink control-related information to a terminal;
- identify a collision between the transmission of the downlink control-related information and a further downlink transmission to be transmitted using at least part of the downlink resources;
- allocate, based on identification of the collision, a second set of resources for the transmission of the downlink control-related information;
- transmit, to at least the terminal, a notification that the transmission of the downlink control-related information in the first set of resources is to be affected by the collision; and
- transmit the downlink control-related information using at least the second set of resources.

14. The circuitry of claim 13, wherein the terminal is pre-configured with information identifying the first set of resources and the second set of resources.

15. The circuitry of claim 13, wherein the transceiver and the control circuit transmit the downlink control-related information by:
- transmitting the downlink control-related information in the first set of resources; and
- separately transmitting the downlink control-related information in the second set of resources.

16. The circuitry of claim 13, wherein the transceiver and the control circuit transmit the downlink control-related information by transmitting the downlink control-related information in only the second set of resources.

17. The circuitry of claim 13, wherein the notification comprises one or more of:
- an indication that downlink control-related information is not transmitted in the first set of resources;
- frequency information for the second set of resources;
- timing information for the second set of resources;
- an identifier for the second set of resources;
- an indication of the resources of the first set of resources affected by the collision; and
- an indication of the resources used for the further downlink transmission.

18. The circuitry of claim 13, wherein
the transceiver and the control circuit transmit are further configured to identify a group of one or more terminals for which the downlink control-related information is affected by the collision,
the group of one or more terminals includes the terminal, and
the at least the terminal comprises the group of one or more terminals.

19. The circuitry of claim 13, wherein the transceiver and the control circuit transmit the transmitting the downlink control-related information by transmitting the downlink control-related information in the first set of resources and second set of resources jointly with a different transmission robustness relative to a default robustness applied in the first set of resources.

20. A base station in a wireless telecommunications system, the base station comprising:
circuitry configured to:
- allocate downlink resources in a first set of resources for transmission of downlink control-related information to a terminal;
- identify a collision between the transmission of the downlink control-related information and a further downlink transmission to be transmitted using at least part of the downlink resources;
- allocate, based on identification of the collision, a second set of resources for the transmission of the downlink control-related information;
- transmit, to at least the terminal, a notification that the transmission of the downlink control-related information in the first set of resources is to be affected by the collision; and
- transmit the downlink control-related information using at least the second set of resources.

* * * * *